United States Patent [19]

Todd et al.

[11] Patent Number: 4,718,238

[45] Date of Patent: Jan. 12, 1988

[54] LIQUID FUEL COMBUSTOR

[75] Inventors: Harry Todd, Burnley; Eric Carr, Blackburn, both of England

[73] Assignee: Lucas Industries Public Limited Company, Birmingham, England

[21] Appl. No.: 41,601

[22] Filed: Apr. 22, 1987

[30] Foreign Application Priority Data

May 3, 1986 [GB] United Kingdom ............... 8610884
Sep. 25, 1986 [GB] United Kingdom ............... 8623101

[51] Int. Cl.$^4$ .............................................. F02C 1/00
[52] U.S. Cl. .......................................... 60/746; 60/733
[58] Field of Search ............... 60/733, 736, 746, 747; 431/158

[56] References Cited

U.S. PATENT DOCUMENTS 2,902,823  9/1959  Wagner ...................... 60/746
4,211,073  7/1980  Guillot ....................... 60/746

Primary Examiner—Carroll B. Dority, Jr.
Attorney, Agent, or Firm—Balogh, Osann, Kramer, Dvorak, Genova & Traub

[57] ABSTRACT

A combustion chamber is defined by a wall having a closed end into which liquid fuel and oxidant are introduced and an open end through which exhaust gases flow. A baffle at the open end causes exhaust gas to flow adjacent the wall. Injector devices direct liquid fuel radially inwardly of the chamber between the closed and open ends. Unburnt fuel attached to the wall cools the walls and passes to the open end before being entrained by the exhaust gas flow through the baffle.

6 Claims, 3 Drawing Figures

LIQUID FUEL COMBUSTOR

This invention relates to a combustor for a liquid fuel-oxidant combination.

It is known to provide power units for auxiliary or emergency operation, in which a turbine is driven by exhaust gases from a combustor. Such a unit is usually required to be of small size and to provide an output for approximately five minutes. The combustor, in which the power output originates, is required to have an output of the order of 150 kw and to be operated repeatedly without sustaining damage. In order to meet these requirements it has been proposed to introduce liquid, which may be liquid fuel, into the chamber at a zone part way along its length. It is an object of the present invention to provide a combustor in which such coolant liquid is thoroughly intermixed with the exhaust gases before leaving the combustor.

According to the invention there is provided a combustor comprising an inner wall defining a chamber having a closed upstream end and a downstream end through which exhaust gases can flow, a device for introducing oxidant and liquid fuel into said upstream end, means for injecting a liquid coolant into said chamber at a zone thereof between said upstream and downstream ends and a baffle member adjacent said downstream end for causing said exhaust gases to flow adjacent said inner wall of said chamber before leaving said combustor, whereby any liquid coolant within said chamber adjacent said inner wall is entrained by said exhaust gases.

Embodiments of the invention will now be described by way of example only and with reference to the accompanying drawings, in which.

Figure 1:
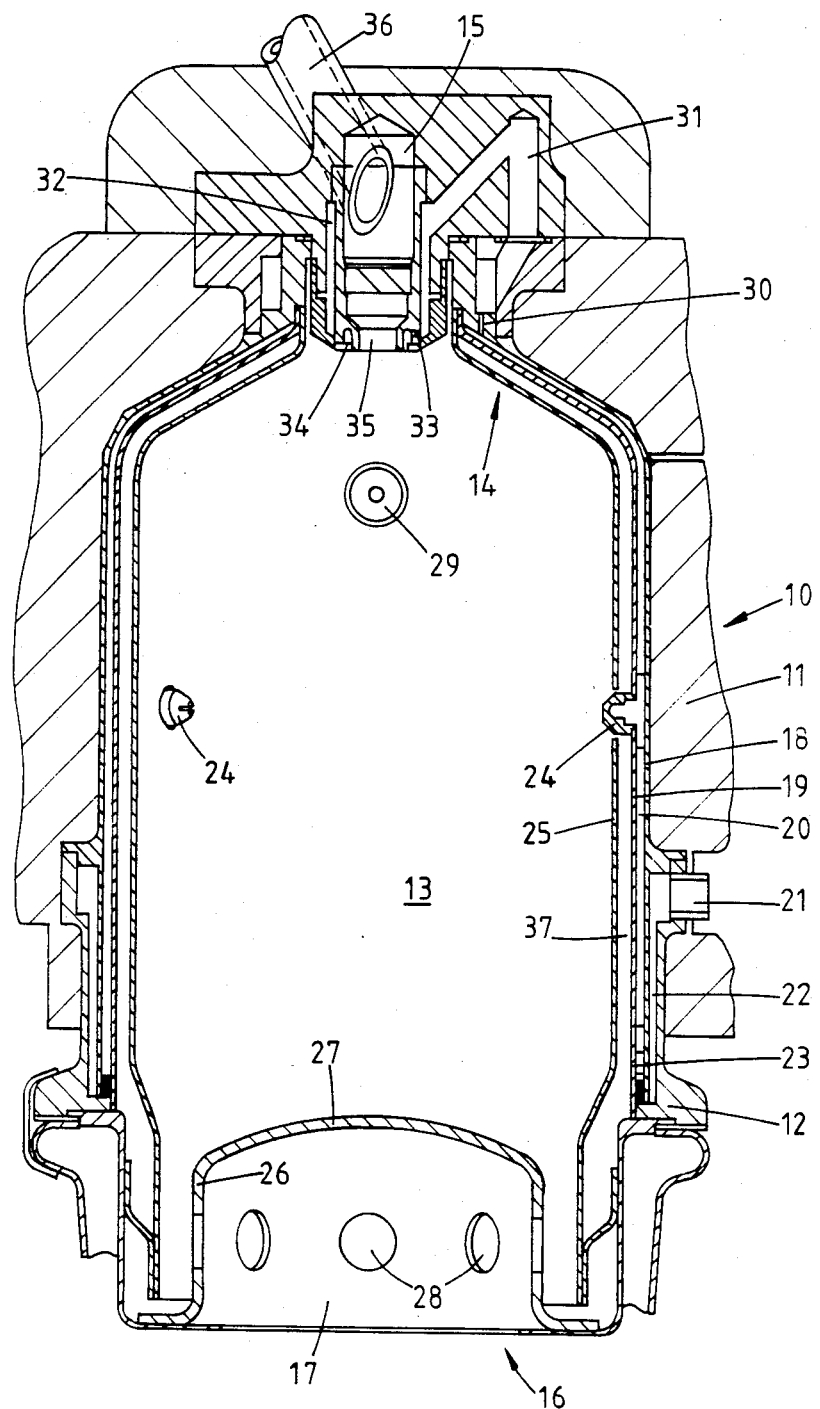
FIG. 1 is a longitudinal section through a combustor.

A body 10 of the combustor is provided by a mass 11 of thermally insulating material and a metal extension 12 and defines a chamber 13 of substantially circular cross section. A closed upstream end 14 of the chamber 13 is provided with a spray device 15 through which oxidant and liquid fuel are introduced into the chamber 13. A downstream open end 16 of the chamber 13 is provided with a baffle element 17 over and through which exhaust gases from the chamber 13 are constrained to flow.

An outer metal liner 18 for the body 10 and a second radially inner metal liner 19 define an annular passage 20 within the body 10. An inlet 21 for liquid fuel opens into an annular chamber 22 between the extension 12 and the first liner 18. The chamber 22 communicates through a plurality of ports 23 with the annular passage 20, through which fuel flows to the spray device 15. Three equi-angularly spaced injectors 24 direct a proportion of the liquid fuel radially of the chamber 13 at a zone thereof between the ends 14, 16. An innermost metal liner 25 is secured to the liner 19 adjacent the spray device 15 and slidably engages the extension 12 adjacent the end 16. The liners 19, 25 define an annular volume 37 surrounding the chamber 13. The injectors 24 pass through clearance holes in the liner 25. An igniter 29 also projects into the space within the liner 25. The baffle element 17 has a cylindrical wall 26 lying relatively close to the downstream end of the liner 25, and a domed end 27 extending into the chamber 13. The wall 26 has a plurality of ports 28 through which exhaust gases from the chamber 13 are constrained to flow. A portion of the liquid fuel introduced through the spray device 15 is unburnt and passes towards the downstream end 16 along the inside of the liner 25 cooling the latter, and is thereafter entrained by the exhaust gases as these pass between the baffle element 17 and the liner 25, this entrainment mainly being as a result of evaporation of the fuel. Radially inward flow through the ports 28 results in thorough mixing of the exhaust gases and any unevaporated fuel, so that a homogeneous fluid stream enters the turbine of the power unit.

The annular passage 20 communicates with the spray device 15 through a plurality of flow restrictors 30, a passage 31 and an annular manifold 32. Fuel flows from the manifold 32 through a plurality of radial bores 33 and leaves the device through a plurality of nozzles 34 which surround a central oxygen outlet 35. Oxygen is supplied to the outlet 35 through an inlet pipe 36.

Figure 2:
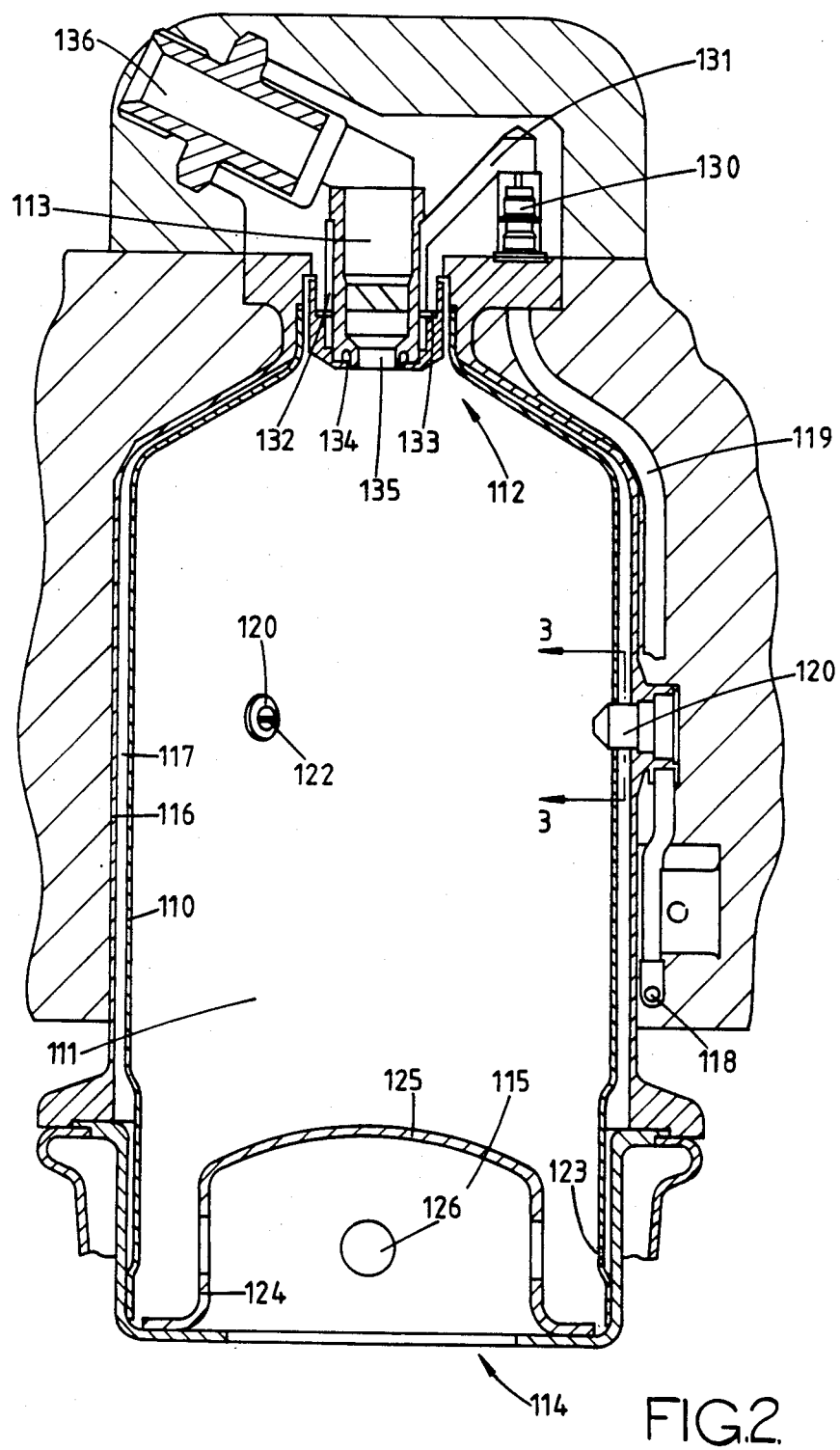
FIG. 2 is a corresponding section through an alternative embodiment.

As shown in FIG. 2 an inner wall 110 defines a chamber 111 of substantially circular cross-section. A closed upstream end 112 of the chamber 111 is provided with a spray device 113 through which oxidant and liquid fuel are introduced into the chamber 111. A downstream end 114 of the chamber 111 is provided with a baffle element 115 over and through which exhaust gases from the chamber 111 are constrained to flow.

Figure 3:
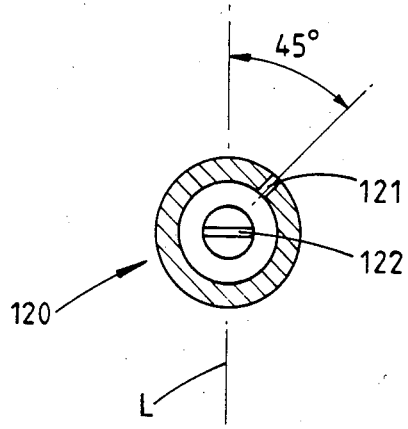
FIG. 3 is a section, to an enlarged scale, on line 3—3 in FIG. 2.

An outer wall 116 is radially spaced from the inner wall 110 and defines in conjunction therewith an annular volume 117 surrounding the chamber 111. An inlet 118 for liquid fuel communicates with the spray device 113 through a passage 119 and a proportion of the fuel is directed to three equi-angularly spaced injectors 120 supported by the walls 110, 116. As shown in FIG. 3 each injector has a first nozzle 121 which opens into the volume 117 and whose axis is at 45° to the long axis L of the chamber 111. Each of the injectors 120 has a second nozzle 122 which opens into the chamber 111 to direct fuel generally radially thereof. The nozzle 122 is elongate so that fuel jets from the nozzles 122 are generally fan-shaped.

The fuel used is methanol and approximately 12% of the total flow of methanol is injected into the volume 117. The direction of this injection is generally towards the end 112 and, as previously stated, at 45° to the long axis of the chamber 111. Though the methanol leaving the nozzles 121 is not atomised, boiling occurs at approximately 100° C. causing a rapid spread of a mixture of liquid and vaporised methanol within the volume 117. It has been found that the cooling effect of the wet methanol vapour is substantially uniform around the wall 110, with no evidence that injection has taken place at only three points. The liquid-vapour mixture leaves the volume 117 through a plurality of ports 123 adjacent the end 114 and mixes with the main flow from the chamber 111.

The baffle element 115 has a cylindrical wall 124 lying relatively close to the downstream end of the wall 110 and a domed end 125 extending into the chamber 111. The wall 124 has a plurality of ports 126 through which exhaust gases from the chamber 111 are constrained to flow.

Fuel passes from the passage 119 to the spray device 113 through flow restrictors 130, a passage 131 and an annular manifold 132. Fuel flows from the manifold 132 through a plurality of radial bores 133 and leaves the device 113 as a conical spray through an annular port 134 which surround a central oxygen outlet 135. Oxygen is supplied to the outlet 135 through an inlet connection 136.

A portion of the fuel from the device 113 becomes attached to the wall 110 and passes towards the downstream end 14, cooling the wall 110, and is thereafter entrained by the exhaust gases as these pass between the baffle element 115 and the wall 110, the entrainment mainly being as a result of evaporation of the fuel. The remainder of the fuel combines with oxygen from the outlet 135 and is burnt in the normal way.

We claim:

1. A combustor comprising an inner wall defining a chamber having a closed upstream end and a downstream end through which exhaust gases can flow, a device for introducing an oxidant and liquid fuel into said upstream end, means for injecting a liquid coolant into said chamber at a zone thereof intermediate said upstream end and said downstream end, and a baffle adjacent said downstream end for causing exhaust gases to flow adjacent said inner wall before leaving said combustor, whereby any liquid coolant within said chamber adjacent said inner wall is entrained by said exhaust gases.

2. A combustor according to claim 1 which includes a second wall radially outwardly spaced from said inner wall to define an annular volume surrounding said chamber.

3. A combustor according to claim 2 in which said means for injecting liquid coolant into said chamber comprises a plurality of injector devices angularly spaced around said chamber and extending through said inner wall.

4. A combustor according to claim 3 in which each said injector device has a first nozzle directed into said chamber and a second nozzle directed into said annular volume.

5. A combustor according to claim 3 which includes a third, outermost wall surrounding said second wall and spaced therefrom to define an annular passage, said injector devices communicating with said annular passage, and means for supplying liquid fuel to said annular passage.

6. A combustor according to claim 5 in which said annular passage communicates with said device for introducing oxidant and liquid fuel into said chamber.

* * * * *